US009550936B2

(12) United States Patent
Mazyar et al.

(10) Patent No.: US 9,550,936 B2
(45) Date of Patent: Jan. 24, 2017

(54) MOBILIZATION OF HEAVY OIL

(75) Inventors: Oleg A. Mazyar, Houston, TX (US); Michael H. Johnson, Katy, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 529 days.

(21) Appl. No.: 13/569,642

(22) Filed: Aug. 8, 2012

(65) Prior Publication Data
US 2014/0045732 A1 Feb. 13, 2014

(51) Int. Cl.
| | |
|---|---|
| *C09K 8/60* | (2006.01) |
| *C09K 8/68* | (2006.01) |
| *C09K 8/524* | (2006.01) |
| *C09K 8/64* | (2006.01) |
| *C09K 8/58* | (2006.01) |
| *E21B 43/16* | (2006.01) |
| *F17D 1/17* | (2006.01) |
| *C09K 8/594* | (2006.01) |

(52) U.S. Cl.
CPC ............... *C09K 8/58* (2013.01); *C09K 8/594* (2013.01); *E21B 43/16* (2013.01); *F17D 1/17* (2013.01); *Y10T 137/0391* (2015.04)

(58) Field of Classification Search
CPC .............................. C09K 8/524; Y10S 507/93
USPC .......................... 507/203, 239, 242, 261, 265
See application file for complete search history.

(56) References Cited

U.S. PATENT DOCUMENTS

| | | | | |
|---|---|---|---|---|
| 5,948,242 A | * | 9/1999 | Ohsol et al. ................... | 208/181 |
| 2007/0295640 A1 | | 12/2007 | Tan et al. | |
| 2008/0245705 A1 | * | 10/2008 | Siskin et al. ................... | 208/177 |
| 2011/0042318 A1 | * | 2/2011 | Painter ..................... | C10G 1/04 |
| | | | | 210/664 |

FOREIGN PATENT DOCUMENTS

CN    1629257 A  *  6/2005

OTHER PUBLICATIONS

CN1629257A, abstract, Xu, et. al., 2005, machine translation.*
Canadian Office Action for Canadian Application No. 2,822,673, dated Jul. 10, 2014, pp. 1-2.
A. Hammami et al., "Asphaltene Precipitation from Live Oils: An Experimental Investigation of Onset Conditions and Reversibility," Energy & Fuels 2000, 14, pp. 14-18.
Chris D. Geddes, "Fluorescent indolium dyes for applications in aqueous halide sensing-part 2: the repeated alkylation of Harmane post quaternisation," Dyes and Pigments 50 (2001) pp. 151-155.
J.P. Heraud et al., "In Situ Upgrading of Heavy Oil and Bitumen," Alain-Yves, Huc, Editor. "Heavy Crude Oils: From Geology to Upgrading: An Overview," Editions TECHNIP, Paris, France, 2011, Chapter 23, 10p.
Jill S. Buckley, "Predicting the Onset of Asphaltene Precipitation from Refractive Index Measurements," Energy & Fuels 1999, 13, pp. 328-332.
Joseph D. McLean et al., "Effects of Asphaltene Solvency on Stability of Water-in-Crude-Oil Emulsions," Journal of Colloid and Interface Science 189, pp. 242-253 (1997).
Joseph D. McLean et al., "Effects of Asphaltene Aggregation in Model Heptane-Toluene Mixtures on Stability of Water-in-Oil Emulsions," Journal of Colloid and Interface Science 196, pp. 23-34 (1997).
Juan Murgich et al., "Molecular Recognition and Molecular Mechanics of Micelles of Some Model Asphaltenes and Resins," Energy & Fuels 1996, 10, pp. 68-76.
Juan Murgich et al., "Molecular Recognition in Aggregates Formed by Asphaltene and Resin Molecules from the Athabasca Oil Sand," Energy & Fuels 1999, 13, pp. 278-286.
Lamia Goual et al., "Effect of Resins and DBSA on Asphaltene Precipitation from Petroleum Fluids," AIChE Journal, Feb. 2004 vol. 50, No. 2, pp. 470-479.
Malika Boukherissa et al., "Ionic Liquids as Dispersants of Petroleum Asphaltenes," Energy & Fuels 2009, 23, pp. 2557-2564.
Narve Aske,"Characterisation of Crude Oil Components, Asphaltene Aggregation and Emulsion Stability by means of Near Infrared Spectroscopy and Multivariate Analysis," Thesis Submitted in Partial Fulfilment of the Requirements for the Degree of Doktor Ingeniør Department of Chemical Engineering Norwegian University of Science and Technology Trondheim, Jun. 2002, 58p.
Narve Aske et al., "Asphaltene Aggregation from Crude Oils and Model Systems Studied by High-Pressure NIR Spectroscopy," Energy & Fuels 2002, 16, pp. 1287-1295.
Norman Carnahan et al., "Effect of Resins on Stability of Asphaltenes," OTC 19002, Copyright 2007, Offshore Technology Conference, This paper was prepared for presentation at the 2007 Offshore Technology Conference in Houston, Texas, U.S.A., Apr. 30-May 3, 2007, 9p.
Norman F. Carnahan et al., "Properties of Resins Extracted from Boscan Crude Oil and Their Effect on the Stability of Asphaltenes in Boscan and Hamaca Crude Oils," Energy & Fuels 1999, 13, pp. 309-314.
O. Leon et al., "Asphaltenes: Structural Characterization, Self-Association, and Stability Behavior," Energy & Fuels 2000, 14, pp. 6-10.

(Continued)

Primary Examiner — Aiqun Li
(74) Attorney, Agent, or Firm — Cantor Colburn LLP

(57) ABSTRACT

A process for increasing mobility of heavy oil includes: disposing a solvating composition comprising a paraffinic solvent and a multifunctional solvent in a heavy oil environment including a heavy oil, the heavy oil comprising asphaltene; contacting the heavy oil with the solvating composition; and stabilizing asphaltene in the heavy oil with the solvating composition to increase mobility of the heavy oil and to form a stabilized heavy oil which includes the heavy oil and solvating composition. A method for making stabilized heavy oil includes separating resin from an oil; combining the resin and a paraffinic solvent to form a solvating composition; disposing the solvating composition in a heavy oil environment which includes heavy oil comprising asphaltene; and contacting the asphaltene with the solvating composition to make stabilized heavy oil, wherein the stabilized heavy oil comprises the solvating composition and heavy oil.

25 Claims, No Drawings

(56) References Cited

OTHER PUBLICATIONS

P. Matthew Spiecker et al., "Effects of petroleum resins on asphaltene aggregation and water-in-oil emulsion formation," Colloids and Surfaces A: Physicochem. Eng. Aspects 220 (2003), pp. 9-27.
Parviz M. Rahimi et al., "Resin-Asphaltene Interactions in Virgin and Cracked Bitumen," Prepr. Pap.-Am. Chem. Soc., Div. Fuel Chem. 2004, 49(2), pp. 545-546.
Rahoma S. Mohamed et al., "Aggregation Behavior of Two Asphaltenic Fractions in Aromatic Solvents," Energy & Fuels 1999, 13, pp. 323-327.
Sabine Van Miert et al., "Isoneocryptolepine, a Synthetic Indoloquinoline Alkaloid, as an Antiplasmodial Lead Compound," J. Nat. Prod. 2005, 68, pp. 674-677.
Simon Ivar Andersen, "Flocculation Onset Titration of Petroleum Asphaltenes," Energy & Fuels 1999, 13, pp. 315-322.
Violeta Kanapickaite et al., "Quaternisation of pyridines with 2-methyl- and 2-amino-4-(chloromethyl)thiazoles," Chemija. 2006. vol. 17. No. 2-3. pp. 30-33.
Xian Si Zhou et al., "Novel Brønsted-acidic ionic liquids based on benzothiazolium cations as catalysts for esterification reactions," J. Serb. Chem. Soc. 76 (12), pp. 1607-1615,(2011).
Yu M. Ganeeva et al., "Asphaltene nano-aggregates: structure, phase transitions and effect on petroleum systems," Russian Chemical Reviews 80 (10), pp. 993-1008, (2011).
Yu-Feng Hu et al., "Effect of the Structures of Ionic Liquids and Alkylbenzene-Derived Amphiphiles on the Inhibition of Asphaltene Precipitation from CO2-Injected Reservoir Oils," Langmuir 2005, 21, pp. 8168-8174.

\* cited by examiner

MOBILIZATION OF HEAVY OIL

BACKGROUND

The viscosity of heavy oil is affected by presence of high molecular weight compounds and their aggregates. Some of these high molecular weight compounds are useful hydrocarbons; however, they cause challenges that impact producing and refining the heavy oil. Efforts to decrease the viscosity of heavy oil involve in-situ precipitation of the high molecular weight compounds. Light, aliphatic hydrocarbons have been used in cyclic solvent injection systems to precipitate some of the high molecular weight compounds. Inhibitors such as polynuclear aromatic hydrocarbons with sulfonic acid functional groups have been added to heavy oil to decrease viscosity of the heavy oil and reduce toluene insoluble material, which is organic and organometallic matter produced in thermal treatment of the heavy oil. Some of the inhibitors can be toxic and, once introduced downhole, can last for an extended period.

Components of heavy oil include paraffins, naphthenes, olefins, resins, asphaltenes, and the like. The chemical structures some of these components include unsaturated hydrocarbon or aromatic portions. Heavy oil also contains heavy metals (e.g., vanadium, nickel, molybdenum, etc.) as well as heteroatoms (e.g., nitrogen, sulfur, and oxygen). The heteroatoms may substitute for carbon atoms in the various heavy oil components. Some of these components are toxic and negatively affect the environment due to, for example, aromatic content.

Asphaltene molecules have been widely reported as having a fused polyaromatic ring system and containing heteroatoms such as sulfur, oxygen, nitrogen, and the like. The heteroatoms may be part of the aromatic ring system or part of other carbocyclic rings, linking groups, or functional groups. Two structural motifs for asphaltene molecules are the so-called continental and archipelago structures. In the continental structure, alkyl chains connect to and branch from a central polyaromatic ring system, which is believed to contain several fused aromatic rings, e.g., 10 or more aromatic rings. In the archipelago structure, multiple polyaromatic ring systems are connected by alkyl chains that may contain a heteroatom, and additional alkyl chains extend freely from the polyaromatic rings. The number of fused aromatic rings in the continental structure can be greater than the number of fused aromatic rings in the archipelago structure.

In addition to the aromatic regions of the asphaltenes, heteroatoms provide the asphaltenes with polar regions, and the terminal alkyl chains provide hydrophobic regions. Asphaltenes also can have polar functional groups such as carbonyl, carboxylic acid, pyrrole, amide, phenol, thiol, etc. Consequently, it is believed that asphaltene molecules aggregate into various micellular structures in oil, with the alkyl chains interacting with the aliphatic oil components and aromatic or polar regions being aligned near the interior of the aggregate or micelle. Precipitation of asphaltenes is widely believed to occur when asphaltenes have a concentration exceeding a critical micelle concentration.

Heavy oil has been characterized as having an API gravity less than 20° with a viscosity at reservoir conditions of lower than 10,000 centipoise, a higher boiling point than lighter ends of crude oil, and a high density compared to lighter oil. The viscosity of heavy oil is one reason why its production has proven difficult, expensive, and time consuming. Furthermore, heavy oil may deposit in the pores of formations, blocking the flow of fluids. Additionally, components of heavy oil, e.g., asphaltenes, can precipitate from a stream of oil and coat boreholes, production tubing, and transport lines, foul processing equipment, or poison catalysts. Despite issues with precipitates from heavy oil, many attempts to upgrade heavy oil still precipitate heavy oil components. Thus, new materials and methods for mobilizing heavy oil would be well received in the art.

BRIEF DESCRIPTION

The above and other deficiencies of the prior art are overcome by, in an embodiment, a process for increasing mobility of heavy oil, the process comprising: disposing a solvating composition comprising a paraffinic solvent and a multifunctional solvent in a heavy oil environment including a heavy oil, the heavy oil comprising asphaltene; contacting the heavy oil with the solvating composition; and stabilizing asphaltene in the heavy oil with the solvating composition to increase mobility of the heavy oil and to form a stabilized heavy oil which includes the heavy oil and solvating composition.

In another embodiment, a method for making stabilized heavy oil comprises: separating resin from an oil; combining the resin, a surfactant, and a paraffinic solvent to form a solvating composition; disposing the solvating composition in a heavy oil environment which includes heavy oil comprising asphaltene; and contacting the asphaltene with the solvating composition to make stabilized heavy oil, wherein the stabilized heavy oil comprises the solvating composition and heavy oil.

DETAILED DESCRIPTION

A detailed description of one or more embodiments is presented herein by way of exemplification and not limitation.

It has been found that decreasing the viscosity of heavy oil and thus enhancing the mobility of the heavy oil is established by introducing a combination of paraffinic solvent, ionic liquid, and resin. The resin is extracted from an oil, e.g., a heavy oil, combined with the ionic liquid, and when introduced with the paraffinic solvent, inserts between asphaltene molecules in asphaltene aggregates and also coats such aggregates. The interaction of the resin and the ionic liquid with the asphaltene maintains or decomposes the micellular structure and stabilizes the asphaltene such that the concentration of the asphaltene is below the critical micelle concentration to avoid precipitate formation.

In an embodiment, a process for increasing mobility of heavy oil includes disposing a solvating composition in a heavy oil environment including a heavy oil. The solvating composition includes a paraffinic solvent and a multifunctional solvent, and the heavy oil includes asphaltene. The solvating composition contacts the heavy oil, thus stabilizing asphaltene in the heavy oil with the solvating composition to increase mobility of the heavy oil and to form a stabilized heavy oil that includes the heavy oil and solvating composition.

According to an embodiment, the paraffinic solvent comprises a C1 to C12 alkane, C1 to C12 alkene, or a combination comprising at least one of the foregoing. Exemplary C1 to C12 alkanes include methane, ethane, propane, butane, pentane, hexane, heptane, octane, nonane, decane, unedecane, dodecane, isomers thereof (i.e., both branched and unbranched alkanes and cyclic alkanes, e.g., isopropane, n-hexane, 2-methylpentane, 2,3-dimethylhexane, 4-propyloctane, cyclopropane, cyclobutane, cyclohexane, bicyclo-2, 2,2-heptane, etc.), and the like. Exemplary C1 to C12 alkenes include ethylene, propene, butene, pentene, hexene, dienes, thereof, trienes thereof, isomers thereof (both branched and unbranched alkenes and cyclic alkenes, e.g., hex-1-ene, hex-2-ene, hex-3-ene, 4-methylhex-1-ene, 4-ethyl-2-methylhex-1-ene, cyclohexene, etc.), and the like. The paraffinic solvent can be gas, liquid, or a combination thereof. The paraffinic solvent is generally miscible with aliphatic portions of the heavy oil, including the aliphatic parts of asphaltenes, resins, and waxes. In some embodiments, the paraffinic solvent can be present in the heavy oil in a dissolved state, below the bubble pressure of the heavy oil. It is contemplated that the paraffinic solvent and the multifunctional solvent in the solvating composition are miscible, partly miscible, or can form more than one phase. Further the miscibility behavior of the paraffinic and multifunctional solvents can be selected with regard to temperature, pressure, and similar conditions, e.g., a hydrophobic or hydrophilic environment.

In an embodiment, the multifunctional solvent comprises resin, surfactant, or a combination comprising at least one of the foregoing. As used herein, "multifunctional" refers to the molecular components of such a solvent. In some embodiments, the multifunctional solvent has a polar portion and an aliphatic portion. In other embodiments, the multifunctional solvent has a hydrophobic portion and a hydrophilic portion. In yet another embodiment, the multifunctional solvent has an aromatic portion and a paraffinic portion. In yet another embodiment, the multifunctional solvent has a charged portion, an aromatic portion, and a paraffinic portion. The multifunctional solvent can be bifunctional, trifunctional, or even having higher functionality, with the number of functional portions determining the physical or chemical interactions of the multifunctional solvent with the paraffinic solvent, heavy oil, or component of the heavy oil, e.g., wax, asphaltenes, and the like. Thus, the multifunctional solvent, can have a charged portion, polar portion, aromatic portion, or paraffinic portion, as well as other functional portions. In some embodiments, the multifunctional solvent includes resin. The resin can be a synthetic resin or natural resin. As used herein, "natural resin" refers to resin extracted (e.g., by separating the resin) from an oil (such as heavy oil) from an earth formation or deposit.

According to an embodiment, the multifunctional solvent is the surfactant. Useful surfactants include ionic liquids as well as fatty acids of up to, for example, 30 carbon atoms such as stearic acid and esters and polyesters thereof, poly(alkylene glycols) such as poly(ethylene oxide), poly(propylene oxide), block and random poly(ethylene oxide-propylene oxide) copolymers. Other surfactants include polysiloxanes, such as homopolymers and copolymers of poly(dimethylsiloxane), including those having functionalized end groups, and the like. Other useful surfactants include those having a polymeric dispersant having poly(alkylene glycol) side chains, fatty acids, or fluorinated groups such as perfluorinated C1-C4 sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones. Additionally, the surfactant can be anionic, cationic, zwitterionic, or non-ionic.

The ionic liquid can be used in a liquid or solid state and can be a liquid at a temperature effective to insert between planes of neighboring asphaltene particles or molecules. The cation of the ionic liquid can be acyclic or can include an aromatic ring, fused aromatic rings, or a heterocyclic ring. In a particular embodiment, a heteroatom in the heterocyclic ring is $N^+$, $S^+$, $P^+$, or a combination thereof, an example of which is N-butylisoquinolinium ion, which has a positive charge that is delocalized over two rings for enhanced dispersibility of asphaltenes. It is contemplated that increasing the number of fused aromatic rings further delocalizes the charge associated with the cationic species. Additionally, the cation can have alkyl groups bonded thereto, such as in an alkylated benzothiazolium having an alkyl chain from, for example, C1 to C30. These alkyl groups increase the miscibility of the surfactant (ionic liquid) with the paraffinic solvent.

According to an embodiment, the cation of the ionic liquid includes imidazolium, pyrazolium, pyridinium, ammonium, piperidinium, pyrrolidinium, sulfonium, phosphonium, morpholinium, quinolinium, isoquinolinium, indolium, thiazolium, benzothiazolium, cyclopropenylium, derivatives thereof, or a combination comprising at least one of the foregoing. According to an embodiment, the cation of the ionic liquid is functionalized with a group such as hydrogen, alkyl, alkyloxy, cylcloalkyl, aryl, alkaryl, aralkyl, aryloxy, aralkyloxy, alkenyl, alkynyl, amine, alkyleneamine, aryleneamine, hydroxy, carboxylic acid group or salt, sulfonic acid group or salt, halogen. Such groups can be, as appropriate given the group, unsubstituted or substituted with a heteroatom or halogen. Non-limiting examples of the counter anion to the cation of the ionic liquid include a halide (e.g., fluoride, chloride, bromide, iodide), tetrachloroaluminate ($AlCl_4^-$), hexafluorophosphate ($PF_6^-$), hexafluoroarsenate ($AsF_6^-$), tetrafluroborate ($BF_4^-$), triflate ($CF_3SO_3^-$), mesylate ($CH_3SO_3^-$), dicyanamide ($(NC)_2N^-$), thiocyanate ($SCN^-$), alkylsulfate ($ROSO_3^-$, where R is a halogentated or non-halogenated linear or branched alkyl group, e.g., $CH_3CH_2OSO_3^-$), tosylate, bis(trifluoromethylsulfonyl)imide, alkyl sulfate ($ROSO_3^-$, where R is a halogentated or non-halogenated linear or branched alkyl group, e.g., $CF_2HCH_2OSO_3^-$), alkyl carbonate ($ROCO_2^-$, where R is a halogentated or non-halogenated linear or branched alkyl group), or a combination comprising at least one of the foregoing. Examples of the ionic liquid include but are not limited to 1-octyl-3-methylimidazolium trifluoromethanesulfonate, 1-hexyl-3-methylimidazolium trifluoromethanesulfonate, 1-butyl-3-methylimidazolium trifluoromethanesulfonate, 1-ethyl-3-methylimidazolium trifluoromethanesulfonate, N,N,N-tributyl-1-heptanaminium trifluoromethanesulfonate, N,N,N-tributyl-1-octanaminium trifluoromethanesulfonate, 1-methyl-3-octylimidazolium chloride, 1-dodecyl-3-methylimidazolium chloride, trihexyl(tetradecyl)phosphonium chloride, 1-hexyl-2-ethyl-3,5-dimethylpyridinium bis[(trifluoromethyl)sulfonyl]imide, N-butylisoquinolinium chloride, 1-hexyl-4-(4-methylpiperidino)pyridinium bromide, 1-butyl-1-methylpiperidinium bis(trifluoromethylsulfonyl)imide, 1,2,3-tris(diethylamino)cyclopropenylium dicyanamide, 1-hexyl-2-propyl-3,5-diethylpyridinium bis[(trifluoromethyl)sulfonyl]imide, benzothiazolium methanesulfonate, benzothiazolium trifluoromethanesulfonate, benzothiazolium p-toluenesulfonate, 2,3,3-trimethyl-1-propyl-3H-indolium iodide, 4-dodecyl-1-[(2-methylthiazol-4-yl)methyl]pyridinium chloride, 1-[(2-aminothiazol-4-yl)methyl]-2-decylpyridinium chloride, and 1-[(2-acetylaminothiazol-4-yl)methyl]-4-dodecylpyridinium chloride.

Further exemplary cationic surfactants include but are not limited to alkyl primary, secondary, and tertiary amines, alkanolamides, quaternary ammonium salts, alkylated imidazolium, and pyridinium salts. Additional examples of the cationic surfactant include primary to tertiary alkylamine salts such as, for example, monostearylammonium chloride, distearylammonium chloride, tristearylammonium chloride; quaternary alkylammonium salts such as, for example, monostearyltrimethylammonium chloride, distearyldimethylammonium chloride, stearyldimethylbenzylammonium chloride, monostearyl-bis(polyethoxy)methylammonium chloride; alkylpyridinium salts such as, for example, N-cetylpyridinium chloride, N-stearylpyridinium chloride; N,N-dialkylmorpholinium salts; fatty acid amide salts such as, for example, polyethylene polyamine; and the like.

Exemplary anionic surfactants include alkyl sulfates, alkyl sulfonates, fatty acids, sulfosuccinates, and phosphates. Examples of an anionic surfactant include anionic surfactants having a carboxyl group such as sodium salt of alkylcarboxylic acid, potassium salt of alkylcarboxylic acid, ammonium salt of alkylcarboxylic acid, sodium salt of alkylbenzenecarboxylic acid, potassium salt of alkylbenzenecarboxylic acid, ammonium salt of alkylbenzenecarboxylic acid, sodium salt of polyoxyalkylene alkyl ether carboxylic acid, potassium salt of polyoxyalkylene alkyl ether carboxylic acid, ammonium salt of polyoxyalkylene alkyl ether carboxylic acid, sodium salt of N-acylsarcosine acid, potassium salt of N-acylsarcosine acid, ammonium salt of N-acylsarcosine acid, sodium salt of N-acylglutamic acid, potassium salt of N-acylglutamic acid, ammonium salt of N-acylglutamic acid; anionic surfactants having a sulfonic acid group; anionic surfactants having a phosphonic acid; and the like.

The nonionic surfactant can be, e.g., an ethoxylated fatty alcohols, alkyl phenol polyethoxylates, fatty acid esters, glycerol esters, glycol esters, polyethers, alkyl polyglycosides, amine oxides, or a combination thereof. Exemplary nonionic surfactants include fatty alcohols (e.g., cetyl alcohol, stearyl alcohol, cetostearyl alcohol, oleyl alcohol, and the like); polyoxyethylene glycol alkyl ethers (e.g., octaethylene glycol monododecyl ether, pentaethylene glycol monododecyl ether, and the like); polyoxypropylene glycol alkyl ethers (e.g., butapropylene glycol mononourl ether); glucoside alkyl ethers (e.g., decyl glucoside, lauryl glucoside, octyl glucoside); polyoxyethylene glycol octylphenol ethers (e.g., Triton X-100 (octyl phenol ethoxylate)); polyoxyethylene glycol alkylphenol ethers (e.g., nonoxynol-9); glycerol alkyl esters (e.g., glyceryl laurate); polyoxyethylene glycol sorbitan alkyl esters (e.g., polysorbates such as sorbitan monolaurate, sorbitan monopalmitate, sorbitan monostearate, sorbitan tristearate, sorbitan monooleate, and the like); sorbitan alkyl esters (e.g., polyoxyethylene sorbitan monolaurate, polyoxyethylene sorbitan monopalmitate, polyoxyethylene sorbitan monostearate, polyoxyethylene sorbitan monooleate, and the like); cocamide ethanolamines (e.g., cocamide monoethanolamine, cocamide diethanolamine, and the like); amine oxides (e.g., dodecyldimethylamine oxide, tetradecyldimethylamine oxide, hexadecyl dimethylamine oxide, octadecylamine oxide, and the like); block copolymers of polyethylene glycol and polypropylene glycol (e.g., poloxamers available under the trade name Pluronics, available from BASF); polyethoxylated amines (e.g., polyethoxylated tallow amine); polyoxyethylene alkyl ethers such as polyoxyethylene stearyl ether; polyoxyethylene alkylene ethers such as polyoxyethylene oleyl ether; polyoxyalkylene alkylphenyl ethers such as polyoxyethylene nonylphenyl ether; polyoxyalkylene glycols such as polyoxypropylene polyoxyethylene glycol; polyoxyethylene monoalkylates such as polyoxyethylene monostearate; bispolyoxyethylene alkylamines such as bispolyoxyethylene stearylamine; bispolyoxyethylene alkylamides such as bispolyoxyethylene stearylamide; alkylamine oxides such as N,N-dimethylalkylamine oxide; and the like Zwitterionic surfactants (which include a cationic and anionic functional group on the same molecule) include, for example, betaines, such as alkyl ammonium carboxylates (e.g., $[(CH_3)_3N^+\!-\!CH(R)COO^-]$ or sulfonates (sulfo-betaines) such as $[RN^+(CH_3)_2(CH_2)_3SO_3^-]$, where R is an alkyl group). Examples include n-dodecyl-N-benzyl-N-methylglycine $[C_{12}H_{25}N^+(CH_2C_6H_5)(CH_3)CH_2COO^-]$, N-allyl N-benzyl N-methyltaurines $[C_nH_{2n-1}N^+(CH_2C_6H_5)(CH_3)CH_2CH_2SO_3^-]$.

A combination of any of the foregoing surfactants can be used. The amount of the multifunctional solvent can be present in the solvating composition in an amount from 0.05 weight percent (wt %) to about 90 wt %, specifically about 0.1 wt % to about 50 wt %, and more specifically about 1 wt % to about 25 wt %, based on the weight of the solvating composition.

The amount of the paraffinic solvent can be present in the solvating composition in an amount from 0.05 wt % to about 90 wt %, specifically about 0.1 wt % to about 50 wt %, and more specifically about 1 wt % to about 25 wt %, based on the weight of the solvating composition.

In another embodiment, a ratio of the paraffinic solvent to the multifunctional solvent in the solvating composition is 10:1 to 1:10, specifically 7:1 to 1:7, and more specifically 2:1 to 1:2, based on a volume of the solvating composition.

In an embodiment, a ratio of the heavy oil to the solvating composition is 200:1 to 0.1:1, specifically 100:1 to 0.1:1, and more specifically 50:1 to 0.1:1, based on the volume of the heavy oil. According to an embodiment, mobilizing the heavy oil can be controlled by varying the amount of the solvating composition present in the heavy oil environment.

The solvating composition can further include an auxiliary solvent. In an embodiment, the auxiliary solvent includes an aromatic solvent. Exemplary, non-limiting aromatic solvents are toluene, pyridine, nitrobenzene, t-butyl benzene, cumene, xylene, ethylbenzene, tetrahydrofuran, trichloroethane, benzene, naphthalene, a derivative thereof, or a combination comprising at least one of the foregoing. In yet another embodiment, the auxiliary solvent includes naphtha, $CO_2$ (including gas or supercritical fluid), or a combination comprising at least one of the foregoing.

As noted in the Background, some polynuclear aromatic hydrocarbons with sulfonic acid functional groups are toxic. Thus, in some embodiments, the solvating composition does not include an aryl phosphonate, aryl sulfate, aryl sulfonate, aryl sulfone, aryl carboxylate, or a combination comprising at least one of the foregoing. As used herein, "aryl" refers to a hydrocarbon group having an aromatic ring, and includes monocyclic and polycyclic hydrocarbons wherein the additional ring(s) of the polycyclic hydrocarbon may be aromatic or nonaromatic (e.g., phenyl or napthyl).

The solvating composition is disposed in the heavy oil environment and contacts the heavy oil. Without being bound by theory, it is believed that the solvating composition interacts with components of the heavy oil that form aggregates, which further associate to form larger particles and can precipitate from the heavy oil. The aggregates can be colloidally suspended in the heavy oil, and as growth of the aggregates continues, precipitation can occur. The aggregates further increase the viscosity of the heavy oil. The solvating composition can interact with aggregate forming compounds such as asphaltenes. The multifunctional solvent interacts with the asphaltene such that the polar or aromatic region of the asphaltene is electrostatically attracted to a similar functionality (e.g., polar functionality or aromatic functionality) of the multifunctional solvent. Similarly, the aliphatic region of the asphaltene is attracted to a similar functionality (e.g., aliphatic chain, etc.) of the multifunctional solvent and paraffinic solvent via van der Waals interactions. In effect, an asphaltene contacted by and interacting with the solvating composition is physically shielded from forming aggregates of asphaltene molecules. Additionally, the solvating composition can decrease the size of aggregates, limit further growth of the aggregates, increase the separation between asphaltenes in the aggregate, and the like. Similarly, the solvating composition can interact with precipitated asphaltenes to decrease the size of the precipitate, limit further growth of the precipitate, increase the separation between asphaltenes in the precipitate, and the like. In an embodiment, the solvating composition exfoliates asphaltene from an aggregate or precipitate. Thus, by interacting with the asphaltene (e.g., molecular asphaltene in the heavy oil, aggregates thereof, precipitates thereof), the asphaltene can be stabilized so that growth of larger sized particles, aggregates, and accumulation of precipitates is decreased, hampered, hindered, slowed, or stopped. It is contemplated that the solvating composition contacts not only the exposed surface of asphaltenes but also can insert between neighboring asphaltene molecules in an aggregate such as a particle containing asphaltene molecules. Heating the solvating composition attached to an asphaltene aggregate (e.g., in the gallery of neighboring asphaltene molecules) can expand the gallery, which can exfoliate or further stabilize the asphaltene. Stabilization of the asphaltenes in the heavy oil with the solvating composition decreases the viscosity of the heavy oil by forming a stabilized heavy oil, i.e., a combination of solvating composition and asphaltenes. In this manner, the mobility of heavy oil is increased.

After stabilization of the asphaltenes with the solvating composition, the stabilized heavy oil can be removed from the heavy oil environment. In an embodiment, after removing the stabilized oil from the heavy oil environment, the solvating composition can be recovered from the stabilized heavy oil and recycled for use in stabilizing more heavy oil. In an embodiment, recycling the solvating composition includes separating the paraffinic solvent from the stabilized heavy oil. In another embodiment, recycling the solvating composition comprises separating the multifunctional solvent from the stabilized heavy oil. In a further embodiment, recycling the solvating composition comprises removing the asphaltene from the stabilized heavy oil. The stabilized heavy oil can be heated to remove the more volatile components, e.g., the paraffinic solvent. In an embodiment, the stabilized heavy oil can be heated to a temperature from 35° C. to 300° C., specifically 35° C. to 200° C., and more specifically 35° C. to 150° C. Separating the paraffinic solvent from the stabilized heavy oil will increase the relative concentration of the asphaltenes and multifunctional solvent in the non-volatilized portion. The asphaltene may remain stabilized by the remaining solvating composition or may form aggregates, which can precipitate. The volatilized paraffinic solvent can be captured, stored, or the like. In an embodiment, the recovered paraffinic solvent is combined with a multifunctional solvent and again used in increasing the mobility of more heavy oil.

Removing the asphaltene from the stabilized heavy oil can also include decreasing a pressure of the stabilized heavy oil. In an embodiment, the pressure can be decreased to or below the bubble point of the stabilized heavy oil. In another embodiment, the pressure can be adjusted from 150 bar to 400 bar, specifically 150 bar to 300 bar, and more specifically less than 270 bar. Decreasing the pressure of the stabilized heavy oil to or below the bubble point results in emission of a lighter alkane fraction from the heavy oil. Consequently, there will be formation of two phases such as a gaseous alkane phase and a liquid phase including heavy oil. Without wishing to be bound by theory, it is believed that a higher mobility of asphaltene molecules in depressurized, less dense oil combined with an increase of asphaltene concentration increases the frequency and strength of interactions between the individual asphaltene molecules and their aggregates suspended in the liquid phase, which induces the formation of larger asphaltene aggregates and their subsequent precipitation. Additionally, the additional paraffinic solvent can be separated from the stabilized heavy oil and collected.

In yet another embodiment, removing the asphaltene from the stabilized heavy oil also can include precipitating the asphaltene. The asphaltene can be precipitated by pressurizing the stabilized heavy oil. Under higher pressure conditions, an equilibrium of the stabilized heavy oil will shift toward placing a fewer number of particles in the liquid phase in accordance with Le Chatelier's principle. Thus, asphaltenes will aggregate with growth of the asphaltene aggregates and precipitation occurring. The pressure of the stabilized heavy oil can be adjusted by introducing a gas or liquid or application of a hydraulic force, for example, by compression using a piston acting on a vessel containing the stabilized heavy oil. The liquid or gas can be inert such as nitrogen. The pressure can be adjusted from 1 atm to 500 atm, specifically 1 atm to 250 atm, and more specifically, 1 atm to 75 atm. In a further embodiment, removing the asphaltene from the stabilized heavy oil includes introducing additional paraffinic solvent to the stabilized heavy oil. Increasing the relative amount of the paraffinic solvent in the stabilized heavy oil can destabilize the stabilized asphaltene. The paraffinic solvent can displace the multifunctional solvent from the asphaltenes, increase the size of asphaltene aggregates, or otherwise to lead to precipitation. The amount of the paraffinic solvent can be increased so that the concentration of the asphaltene increases above the critical micelle concentration of the asphaltene. In an embodiment, the amount of the paraffinic solvent can be adjusted from 10 volume percent (vol %) to 80 vol %, specifically 15 vol % to 60 vol %, and more specifically 20 vol % to 50 vol %, based on the volume of the stabilized heavy oil. Removing the asphaltene from the stabilized heavy oil can also include decreasing a pressure of the stabilized heavy oil below the bubble point of an alkane in the paraffinic solvent. Here, decreasing the pressure can be performed after introducing additional paraffinic solvent. In an embodiment, the asphaltenes are removed from the stabilized heavy oil (which can leave predominately, e.g., the solvating composition), and the multifunctional solvent and the paraffinic solvent are separated from each other, e.g., by distillation of the paraffinic solvent.

According to an embodiment, removing the asphaltene from the stabilized heavy oil includes cooling the stabilized heavy oil. Decreasing the temperature of the stabilized heavy oil can increase the concentration of aggregates, decrease the affinity of the solvating composition for the asphaltenes, decrease the rate of association of the solvating composition with the asphaltenes, or the like. The stabilized heavy oil can be cooled to a temperature from −20° C. to 35° C., specifically −15° C. to 20° C., and more specifically −5° C. to 10° C.

After the asphaltene precipitates, the asphaltene can be separated from the liquid or gas components by releasing the gas, decanting the liquid, filtration, mechanical recovery, or a combination thereof.

To further aid mobilization of the heavy oil before removal of the stabilized heavy oil from the heavy oil environment, a temperature of the heavy oil environment can be adjusted from 15° C. to 1500° C., specifically 50° C. to 1000° C., and more specifically 100° C. to 800° C. As described in more detail below, thermal processes such as in-situ combustion, electrical and inductive heating, cyclic steam stimulation, and steam flooding can be used to increase the temperature of the heavy oil environment to further decrease the viscosity of the stabilized heavy oil. In an additional embodiment, a pressure of the heavy oil environment before removal of the stabilized heavy oil can be adjusted from 1 atm to 200 atm above the natural pressure of the heavy oil environment, specifically 1 atm to 150 atm, and more specifically 1 atm to about 80 atm. The pressure of the heavy oil environment can affect the relative strength of interactions (e.g., among the solvating composition and stabilized asphaltene) and availability of the solvating composition, e.g., the paraffinic solvent.

The stabilized heavy oil has advantageous properties. According to an embodiment, the stabilized heavy oil has a higher API gravity than that of the heavy oil before contact with the solvating composition. In a particular embodiment, the stabilized heavy oil has an API gravity that is three degrees (3°) or more greater than that of the heavy oil before contact with the solvating composition, specifically 5° or more, and more specifically 10° or more. In an embodiment, the viscosity of the stabilized heavy oil is less than that of the heavy oil before contact with the solvating composition. In a particular embodiment, the viscosity of the stabilized heavy oil is less than that of the heavy oil before contact with the solvating composition by at least 99%, specifically at least 95%, and more specifically at least 90%, based on the viscosity of the heavy oil before contact with the solvating composition.

The stabilized heavy oil having these properties is an outcome of using the solvating composition to stabilize asphaltenes of the heavy oil in the heavy oil environment. In an embodiment, the temperature of the heavy oil environment can be increased before or after introduction of the solvating composition in the heavy oil environment. As mentioned, the heavy oil environment can be subjected to heating to an increased temperature that can occur due to electrical heating, in-situ combustion, steam flooding, cyclic steam stimulation, steam assisted gravity drainage, or the like. During cyclic steam stimulation, high pressure steam is injected into the heavy oil environment with subsequent soaking for a period of time to diffuse the administered heat. Steam flooding includes injection of steam, which increases the temperature of the heavy oil environment and can increase the pressure of the heavy oil environment to urge the stabilized heavy oil down the pressure gradient away from the high pressure source, e.g., toward a production site. Cyclic steam stimulation and steam flooding rely on steam generated from sources such as natural gas and can be costly. The processes herein reduce the cost by decreasing the amount of energy required by reducing the viscosity of the heavy oil to that of the stabilized heavy oil, which reduces the amount of steam required to be injected. The amount of energy expended relates to the temperature increase of the heavy oil environment that is needed to increase the flow of heavy oil to a flow velocity that is economically and technically acceptable. Without being bound by theory, in the case of pure viscosity decrease of heavy oil without forming stabilized heavy oil, the temperature is much higher (and thus more costly) than using the methods herein that include stabilizing asphaltenes in the heavy oil with the solvating composition to mobilize the heavy oil by forming the stabilized heavy oil.

In an embodiment, the heavy oil environment is a vessel, reservoir, borehole, processing facility, downhole, refinery, pre-refinery facility, production zone, formation, tubular, reactor, wellbore, production tubing, casing, or a combination comprising at least one of the foregoing. The pre-refinery facility can include items such as transportation tubing, processing equipment, storage facilities, and the like.

According to an embodiment, the solvating composition is disposed in a heavy oil environment in, near, or outside a main heating or combustion zone. Disposal can be accomplished by introduction, e.g., injection, of the solvating composition prior to heating the heavy oil environment. After the solvating composition is introduced into the heavy oil environment, the solvating composition can flow or diffuse from its introduction site to another location in the heavy oil environment. If the same injection site is used to introduce heat into the heavy oil environment, such as with injection of gases for in-situ combustion, the timing between the disposal of the solvating composition and that of the in-situ combustion reagents (e.g., air, steam, etc.) can be adjusted so that the solvating composition is located at a desired location relative to the main heating or combustion zone, e.g., outside of such a zone. Thus, the effective radius for decreasing the viscosity of the heavy oil is increased since the solvating composition has moved to a position in the heavy oil environment beyond the combustion or heating zone. Alternatively, multiple injection sites in the heavy oil environment can be used to allow independent introduction of the solvating composition and heat source at different locations in the heavy oil environment. In an embodiment, a first injection site in the heavy oil environment is used for the solvating composition, and a second injection site is used for disposing the heat source (e.g., in-situ combustion agents, steam, or the like). Thus, not only is the heavy oil heated in the heating or combustion zone, but the heavy oil also is subjected to the solvating composition (and thus mobilizing the heavy oil) in, near, or outside of the combustion zone.

In another embodiment, the stabilized heavy oil can be dispensed from the heavy oil environment. The location of dispensing the stabilized heavy oil can occur at a location that is closer to a position corresponding to where the solvating composition was introduced into the heavy oil environment. In another embodiment, dispensing the stabilized heavy oil can occur at a location that is further from the heat source (such as a combustion zone or injection site for steam, etc.) than the injection site for the solvating composition. Thus, the stabilized heavy oil can be dispensed from the heavy oil environment before lower viscosity fluids, e.g., heavy oil that has not been subjected to stabilization by the solvating composition, is incident at the dispensing area, e.g., a production zone or well or dispensing valve for a vessel containing the heavy oil.

Thus, according to an embodiment, the heavy oil is converted to stabilized heavy oil by contact with the solvating composition followed by stabilization of the asphaltenes with the solvating composition. In a particular embodiment, the stabilized heavy oil is removed from the heavy oil environment that includes a downhole environment, borehole, wellbore, refinery, pre-refinery facility, production zone, formation, reservoir, production tubing, casing, or a combination comprising at least one of the foregoing. In one embodiment, increasing the mobility of the heavy oil occurs prior to removing the heavy oil from the heavy oil environment. Alternatively, increasing the mobility of the heavy oil occurs subsequent to removing the heavy oil from the heavy oil environment.

The solvating composition can be disposed in the heavy oil environment in various ways. In an embodiment, disposing the solvating composition includes placing the solvating composition in a fluid. According to an embodiment, the fluid can entrain the solvating composition to deliver the solvating composition to the heavy oil environment via, e.g., injection. In another embodiment, the solvating composition is disposed (e.g., physisorbed or chemically bound) on a surface of a downhole element, e.g., gravel in a gravel pack, proppant (which holds fractures open after a hydraulic fracturing treatment), or the like. In still another embodiment, the solvating composition can be disposed in a matrix. In yet another embodiment, the solvating composition can be inside a container. The matrix or container can disintegrate to release the solvating composition at a selected time. An example matrix or container includes a polymer that is soluble or disintegrable in a particular fluid. Thus, in another embodiment, the matrix or container is contacted by a decomposing fluid to release the solvating composition.

In one embodiment, the solvating composition is disposed in the heavy oil environment followed by increasing the temperature thereof by in-situ combustion. Combustion of heavy oil or coke in a formation can provide heat to increase the temperature of the heavy oil environment and aid in mobilizing the heavy oil by the solvating composition. In a specific embodiment, the hydrocarbon present in a downhole formation can be ignited using injected air or another oxygen source (including pure oxygen, steam, and the like) in the heavy oil environment. Increasing the temperature includes techniques that can elevate the temperature to about 35° C. to about 1200° C., specifically about 50° C. to about 1000° C., and more specifically about 100° C. to about 800° C. Dry air or air mixed with water can be injected. Combustion propagates through the heavy oil environment. In an embodiment, the combustion propagates from an injection well to a production well. In some embodiments, the solvating composition mobilizes the heavy oil ahead of the combustion gases or fluids and the combustion front. Heat radiates from the combustion zone and increases the temperature of the heavy oil environment to decrease further the viscosity of the stabilized heavy oil. Higher temperatures also can increase the affinity and rate of association of the asphaltenes with the solvating composition.

Disposal of the solvating composition, steam, or in-situ combustion agents (e.g., oxygen source, and the like) can be accomplished using, e.g., a vertical or horizontal well. Further, more than one well can be used. In an embodiment, disposing such items in the heavy oil environment includes injecting via an injection well, which is different from a production well. In another embodiment, disposing an item in the heavy oil environment includes injection in a production well. In a further embodiment, injection (i.e., disposal) can occur in one or more vertical wells, horizontal wells, or a combination thereof. In one embodiment, the stabilized heavy oil can be produced in one or more vertical wells, horizontal wells, or a combination thereof. Accordingly, the injected item or subsequent stabilization of asphaltenes to form the stabilized heavy oil can be controlled and constrained to a certain portion of the heavy oil environment. Moreover, the configuration (e.g., size, number, or spacing) of injection or production sites (e.g., wells) can be selected for such control. As a result, a path or distance that the stabilized oil traverses for removal (e.g., production) from the heavy oil environment can be minimized. In another embodiment, the path of travel of the stabilized heavy oil can be optimized to avoid barriers, for example. In certain embodiments, multiple wells can be used such as a multi-spot pattern (e.g., 5-spot pattern) with producing wells (e.g., four producing wells) surrounding an injection well. In a particular embodiment, spacing between wells can be selected based on the surface footprint desired or with respect to physical and chemical properties of the solvating composition in the heavy oil environment. In some embodiments, the well spacing can be less than 10 acres, specifically less than 5 acres, and more specifically less than 1 acre. In a further embodiment, a vertical well can have multilateral branches. In another embodiment, a horizontal well can have multilateral branches. A combination of any of the foregoing wells, injection sites, or production sites can be used.

In a further embodiment, gravity assisted drainage is used for removal of the heavy oil from the heavy oil environment. Here, horizontal wells are positioned such that a first horizontal well is below a second horizontal well. The solvating composition is injected in the first well, and the solvating composition diffuses from the first well. Steam is then injected in the first well, heating the heavy oil environment between the two wells. The solvating composition contacts the heavy oil, which is subsequently stabilized to stabilized heavy oil, and the stabilized heavy oil flows into the second horizontal well. Alternatively, in-situ combustion can occur by injecting an oxygen source in the first well after injection of the solvating composition followed by making the stabilized heavy oil by stabilizing the asphaltenes with the solvating composition. In another embodiment, heated fluid (e.g., an auxiliary solvent or additional solvating composition) can be injected into the heavy oil environment. The heated fluid can disperse the stabilized oil to increase its mobility further.

In a another embodiment, a method for making stabilized heavy oil includes separating resin from an oil. The resin is combined with a paraffinic solvent to form a solvating composition, which is disposed in a heavy oil environment, including heavy oil that comprises asphaltene. The solvating composition contacts the asphaltene to form stabilized heavy oil, which comprises the solvating composition and heavy oil. Here, the resin interacts with asphaltene and can associate with or coat the asphaltene or aggregates thereof. Thus, the resin creates a barrier to aggregation (or further aggregation) of asphaltenes. The solvating composition can further include a surfactant. The stabilized heavy oil can be removed from the heavy oil environment, and the resin, paraffinic solvent, or asphaltene can be separated from the stabilized heavy oil. The separated resin can be combined with a paraffinic solvent or can be used neat to be subsequently disposed in a heavy oil environment. The asphaltenes separated or still part of the stabilized heavy oil can be treated such as by transformation under hydrogenating conditions, which can include temperatures from 300° C. to 1200° C., specifically 350° C. to 1000° C., and more specifically 350° C. to 800° C. Hydrogen source pressures used for hydrogenation can be from about 3 atm to 10 atm, specifically 3 atm to 8 atm, and more specifically 3 atm to 5 atm. A hydrogenation catalyst can be present.

Thus, the methods herein can be used to decrease heavy oil viscosity in a heavy oil environment. A solvating composition comprising a paraffinic solvent and multifunctional solvent can be used to stabilize asphaltenes in the heavy oil.

In an embodiment, heavy oil that constricts flow in, for example, a tubular, can be mobilized to restore or increase flow in a pipeline. Additionally, mobilizing heavy oil can increase permeability in porous media and flow channels. Because of stabilizing the asphaltenes in the heavy oil, the viscosity of the fluid in the heavy oil environment decreases. Lowering the viscosity of the oil improves production efficiency. Additionally, the detrimental effects of asphaltenes and other heavy oil components can be diminished or eliminated, including alleviation of flocculants that can plug a reservoir or production tubing, restrict flow in a transport line, foul a production facility, alter wettability of crude oil, or poison a refinery catalyst. Moreover, the methods herein reduce the viscosity of heavy oil and prevent or significantly reduce the precipitation of asphaltenes, preserving permeability of a formation. Hence, the methods represent an enhanced solvent injection process superior to other processes that result in asphaltene precipitation that may plug an oil-bearing formation.

The methods herein are further illustrated by the following non-limiting example.

Example. A first sample of crude oil is placed in a vessel, and 40 parts of n-heptane is added to the vessel to precipitate asphaltenes from the crude oil. The mixture of crude oil with n-heptane is filtered to remove the precipitated asphaltenes. Then, n-heptane is removed from the supernatant and 40 parts of n-pentane is added to the treated crude oil sample to precipitate resins. The resins are retrieved from the vessel and mixed with 1,2,3-tris(diethylamino)cyclopropenylium dicyanamide in 20 parts to 1 part ratio. Subsequently, n-heptane is added to the resins/ionic liquid mixture until the latter is completely dissolved. The mixture of n-heptane with resins and the ionic liquid is introduced to a second vessel containing a second sample of crude oil. This mixture is stirred for 16 hours to form stabilized heavy oil. After this procedure, aliquots are removed for analysis. The viscosity of the stabilized heavy oil is less than the original crude oil, and the API gravity of the stabilized heavy oil is greater than the original crude oil. Precipitation of asphaltenes from the treated oil sample is not noticed. Note that the addition of the same volume of n-heptane to the third sample of crude oil results in asphaltene precipitation while the addition of the same volume of the n-heptane/resins mixture to the fourth sample of crude oil resulted in precipitation of smaller amount of asphaltenes.

While one or more embodiments have been shown and described, modifications and substitutions may be made thereto without departing from the spirit and scope of the invention. Accordingly, it is to be understood that the present invention has been described by way of illustrations and not limitation. Embodiments herein are can be used independently or can be combined.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive, rather the elements can be used separately or can be combined together under appropriate circumstances.

What is claimed is:

1. A method for increasing mobility of heavy oil, the method comprising:
    disposing a solvating composition comprising a paraffinic solvent and a multifunctional solvent in a heavy oil environment including a heavy oil, the heavy oil comprising asphaltene;
    contacting the heavy oil with the solvating composition; and stabilizing asphaltene in the heavy oil with the solvating composition to increase mobility of the heavy oil and to form a stabilized heavy oil which includes the heavy oil and solvating composition;
    wherein the multifunctional solvent comprises an ionic liquid and a surfactant different from the ionic liquid, and
    wherein the ionic liquid comprises one or more of the following cations: pyrazolium; piperidinium; sulfonium; morpholinium; indolium; thiazolium; benzothiazolium; or cyclopropenylium.

2. The method of claim 1, further comprising removing the stabilized heavy oil from the heavy oil environment.

3. The method of claim 2, further comprising recycling the solvating composition after removing the stabilized oil from the heavy oil environment.

4. The method of claim 3, wherein recycling comprises separating the paraffinic solvent from the stabilized heavy oil.

5. The method of claim 3, wherein recycling the solvating composition comprises separating the multifunctional solvent from the stabilized heavy oil.

6. The method of claim 3, wherein recycling the solvating composition comprises removing the asphaltene from the stabilized heavy oil.

7. The method of claim 6, wherein removing the asphaltene from the stabilized heavy oil comprises:
    heating the stabilized heavy oil to evaporate the paraffinic solvent from the stabilized heavy oil;
    decreasing a pressure of the stabilized heavy oil;
    precipitating the asphaltene; or
    a combination comprising at least one of the foregoing.

8. The method of claim 7, wherein precipitating the asphaltene comprises:
    pressurizing the stabilized heavy oil;
    introducing additional paraffinic solvent to the stabilized heavy oil;
    decreasing a pressure of the stabilized heavy oil below the bubble point of an alkane in the paraffinic solvent;
    cooling the stabilized heavy oil; or
    a combination comprising at least one of the foregoing.

9. The method of claim 1, wherein stabilizing asphaltene in the heavy oil comprises maintaining the asphaltene at a concentration lower than a critical micelle concentration.

10. The method of claim 1, wherein the multifunctional solvent further comprises a resin.

11. The method of claim 1, wherein the paraffinic solvent comprises a C1 to C12 alkane, C1 to C12 alkene, or a combination comprising at least one of the foregoing; and the surfactant comprises a fatty acid.

12. The method of claim 1, wherein the solvating composition further comprises an auxiliary solvent which includes an aromatic solvent.

13. The method of claim 12, wherein the aromatic solvent includes toluene, pyridine, nitrobenzene, t-butyl benzene, cumene, xylene, ethylbenzene, tetrahydrofuran, trichloroethane, or a combination comprising at least one of the foregoing.

14. The method of claim 1, wherein the solvating composition does not include an aryl phosphonate, aryl sulfate, aryl sulfonate, aryl sulfone, aryl carboxylate, or a combination comprising at least one of the foregoing.

15. The method of claim 1, wherein a ratio of the heavy oil to the solvating composition is 50:1 to 0.1:1, based on the volume of the heavy oil.

16. The method of claim 1, wherein a ratio of the paraffinic solvent to the multifunctional solvent in the solvating composition is 10:1 to 1:10, based on a volume of the solvating composition.

17. The method of claim 1, wherein the heavy oil environment comprises vessel, reservoir, borehole, processing facility, downhole, refinery, pre-refinery facility, production zone, formation, tubular, reactor, or a combination comprising at least one of the foregoing.

18. The method of claim 1, wherein a viscosity of the stabilized heavy oil is less than that of the heavy oil before contacting with the solvating composition.

19. The method of claim 1, wherein the stabilized heavy oil has an API gravity which is greater than that of the heavy oil before contacting with the solvating composition.

20. The method of claim 1, wherein the ionic liquid comprises one or more of the following: 1-butyl-1-methyl-piperidinium bis(trifluoromethylsulfonyl)imide; 1,2,3-tris(diethylamino)cyclopropenylium dicyanamide; benzothiazolium methanesulfonate; benzothiazolium trifluoromethanesulfonate; benzothiazolium p-toluenesulfonate; or 2,3,3-trimethyl-1-propyl-3H-indolium iodide.

21. The method of claim 1, wherein the surfactant different from the ionic liquid is one or more of the following: an anionic surfactant; cationic surfactant; zwitterionic surfactant; or non-ionic surfactant.

22. A method for increasing mobility of heavy oil, the method comprising:
disposing a solvating composition comprising a paraffinic solvent and a multifunctional solvent in a heavy oil environment including a heavy oil, the heavy oil comprising asphaltene;
contacting the heavy oil with the solvating composition; and stabilizing asphaltene in the heavy oil with the solvating composition to increase mobility of the heavy oil and to form a stabilized heavy oil which includes the heavy oil and solvating composition;
wherein the multifunctional solvent comprises an ionic liquid and a resin extracted from an oil obtained from an earth formation or deposit; and
wherein the ionic liquid comprises one or more of the following cations: pyrazolium; piperidinium; sulfonium; morpholinium; indolium; thiazolium; benzothiazolium; or cyclopropenylium.

23. The method of claim 22, wherein the resin is extracted from a heavy oil.

24. The method of claim 22, wherein the multifunctional solvent further comprises a surfactant different from the ionic liquid.

25. The method of claim 22, wherein the ionic liquid comprises one or more of the following: 1-butyl-1-methyl-piperidinium bis(trifluoromethylsulfonyl)imide; 1,2,3-tris(diethylamino)cyclopropenylium dicyanamide; benzothiazolium methanesulfonate; benzothiazolium trifluoromethanesulfonate; benzothiazolium p-toluenesulfonate; or 2,3,3-trimethyl-1-propyl-3H-indolium iodide.

* * * * *